(12) United States Patent
Astesiano et al.

(10) Patent No.: US 12,504,165 B2
(45) Date of Patent: Dec. 23, 2025

(54) DIRECT FLAME BURNER UNIT FOR FURNACES FOR THE THERMO-CHEMICAL TREATMENT OF STEEL STRIPS IN CONTINUOUS HOT-DIP GALVANIZING PLANTS

(71) Applicant: TENOVA S.P.A., Milan (IT)

(72) Inventors: Davide Astesiano, Genoa (IT); Claudio Leoncini, Genoa (IT)

(73) Assignee: TENOVA S.P.A., Milan (IT)

( * ) Notice: Subject to any disclaimer, the term of this patent is extended or adjusted under 35 U.S.C. 154(b) by 474 days.

(21) Appl. No.: 18/000,800

(22) PCT Filed: Jun. 4, 2021

(86) PCT No.: PCT/IB2021/054896
§ 371 (c)(1),
(2) Date: Dec. 5, 2022

(87) PCT Pub. No.: WO2021/250517
PCT Pub. Date: Dec. 16, 2021

(65) Prior Publication Data
US 2023/0220990 A1  Jul. 13, 2023

(30) Foreign Application Priority Data
Jun. 10, 2020 (IT) .......... 102020000013879

(51) Int. Cl.
*F23D 14/02* (2006.01)
*C21D 1/52* (2006.01)
(Continued)

(52) U.S. Cl.
CPC .............. *F23D 14/02* (2013.01); *C21D 1/52* (2013.01); *C21D 1/76* (2013.01); *C21D 8/0247* (2013.01);
(Continued)

(58) Field of Classification Search
CPC ...... F23D 14/02; F23D 14/22; F23C 2202/10; F27D 99/0033
(Continued)

(56) References Cited

U.S. PATENT DOCUMENTS 5,269,679 A    12/1993   Syska et al.
5,473,881 A *  12/1995   Kramnik .................. F23R 3/34
                                                60/737
(Continued)

FOREIGN PATENT DOCUMENTS

CN    111 121 023 A     5/2020
DE    43 30 160 A1      3/1995
(Continued)

OTHER PUBLICATIONS

International Search Report issued Sep. 23, 2021 in PCT/IB2021/054896 filed on Jun. 4, 2021, 3 pages.

*Primary Examiner* — Avinash A Savani
(74) *Attorney, Agent, or Firm* — Oblon, McClelland, Maier & Neustadt, L.L.P.

(57) ABSTRACT

A direct flame furnace burner unit for furnaces for the thermo-chemical treatment of steel strips in continuous hot-dip galvanizing plants includes a burner with a combustion head provided with a combustion chamber having an outlet opening of the combustion flame, and a body to which the combustion head is fixed. The body includes a first chamber which is in communication with the combustion chamber, a first lance for the injection of a fuel into the combustion chamber, a mixing chamber provided with at least a first inlet and a second inlet opening which is connectable to a second supply source, at least a second lance for the injection of the mixture into the combustion (Continued)

chamber. The burner is operable in two distinct operating modes, a diffusive flame combustion mode and a premixed flame combustion mode.

11 Claims, 7 Drawing Sheets

(51) Int. Cl.
    *C21D 1/76*     (2006.01)
    *C21D 8/02*     (2006.01)
    *C21D 8/04*     (2006.01)
    *C21D 9/00*     (2006.01)
    *C21D 9/48*     (2006.01)
    *C21D 9/56*     (2006.01)
    *C21D 9/573*     (2006.01)
    *C21D 11/00*     (2006.01)
    *F23D 14/22*     (2006.01)
    *F27D 99/00*     (2010.01)

(52) U.S. Cl.
    CPC ......... *C21D 8/0447* (2013.01); *C21D 9/0006* (2013.01); *C21D 9/005* (2013.01); *C21D 9/48* (2013.01); *C21D 9/562* (2013.01); *C21D 9/573* (2013.01); *C21D 11/00* (2013.01); *F23D 14/22* (2013.01); *F27D 99/0033* (2013.01); *F23C 2202/10* (2013.01)

(58) Field of Classification Search
    USPC .......................................................... 431/354
    See application file for complete search history.

(56) References Cited

U.S. PATENT DOCUMENTS

| | | | |
|---|---|---|---|
| 2002/0197574 A1 | 12/2002 | Jones et al. | |
| 2003/0190570 A1 | 10/2003 | Jones et al. | |
| 2004/0050207 A1* | 3/2004 | Wooldridge | B22F 9/28 |
| | | | 420/557 |
| 2013/0157204 A1* | 6/2013 | Hong | F23D 14/66 |
| | | | 431/354 |
| 2013/0239857 A1* | 9/2013 | Kim | F23G 7/065 |
| | | | 110/213 |
| 2017/0138268 A1* | 5/2017 | Nakahara | F23D 17/00 |
| 2017/0292707 A1* | 10/2017 | Tsunoda | F01D 9/023 |
| 2019/0186732 A1* | 6/2019 | Taylor | F23C 7/06 |

FOREIGN PATENT DOCUMENTS

| | | |
|---|---|---|
| EP | 0 663 989 A1 | 7/1995 |
| EP | 0 725 251 A1 | 8/1996 |
| EP | 2 458 022 B1 | 7/2013 |

\* cited by examiner

DIRECT FLAME BURNER UNIT FOR FURNACES FOR THE THERMO-CHEMICAL TREATMENT OF STEEL STRIPS IN CONTINUOUS HOT-DIP GALVANIZING PLANTS

The present invention relates to a direct flame burner unit for furnaces for thermo-chemical treatment of steel strips in continuous hot-dip galvanizing plants.

The present invention further relates to a furnace, horizontal or vertical, for thermo-chemical treatment of steel strips in a continuous hot-dip galvanizing plant comprising said burner unit and to a continuous hot-dip galvanizing plant for steel strips comprising said furnace.

New types of steel have been developed in response to the demands of various industrial sectors—including, in particular, the automotive sector—for structural materials that are light, easy to process, recyclable and have high mechanical properties.

The family of these so-called high strength steels is generally referred to by the acronym AHSS (Advanced High Strength Steel); different types of steel belong to it: Dual Phase Steel Grades (DP), Transformation Induced Steel Grades (TRIP), Complex Phase Steel Grade (CP), Martensitic Steel Grade (MS), Ferritic-Bainitic Steel Grades (FB), Twinning-Induced Plasticity Steel Grade (TWIP), Hot-Formed Steel Grades (HF), Post-Forming Heat-Treatable Steel Grades (PFHT), Special Processed Steel Grades.

The chemical composition of AHSS steels is characterized by the presence of deliberate quantities of binding elements including, in particular, Silicon (Si), Manganese (Mn) and Aluminium (Al), as well as Nickel (Ni), Chromium (Cr), Molybdenum (Mo), Niobium (Nb), Vanadium (V), Titanium (Ti), Boron (B), Tungsten (W) and Zirconium (Zr).

The presence of these binding elements has influenced the conduct of heat and chemical treatments, including, in particular, the continuous hot-dip galvanizing treatment to which steel strips are generally subjected.

In continuous hot-dip galvanizing, the steel strips are coated with a layer of zinc or zinc alloy (ZnAl or ZnAlMg) that imparts corrosion protection.

Continuous hot-dip galvanizing is carried out in plants in which the strip, before being immersed in the molten metal bath, passes through a furnace in which it undergoes a thermal and chemical treatment in a controlled atmosphere.

The need to treat strips of different types of steel (conventional/traditional and AHSS, including those of the so-called "third generation") imposes an ever-increasing flexibility of the galvanizing plants and, in particular, of the relevant furnaces, whose operation must be able to adapt to the process requirements imposed by the different types of steel.

To this end, the furnaces of continuous hot-dip galvanizing plants (generically referred to as "galvanizing furnaces"), whether they are vertical or horizontal, are divided into a plurality of zones and sections that are selectively activated or deactivated according to the process requirements imposed by the type of steel.

Like for example described in US20030047255A1, the following zones generally follow one another in a galvanizing furnace:
A heating zone, along which the steel strip is heated up to a temperature of about 800-900° C.;
A maintaining zone, along which the strip is maintained at the heating temperature for a specified time;
A cooling zone, along which the strip is cooled down up to a temperature close to the galvanizing temperature or in any case of the galvanized coating (ZnAl or ZnAlMg) and generally equal to about 450°-480° C.

In general terms, galvanizing furnaces can be divided into two different categories based on the manner in which the heating zone is conducted:
furnaces in which the heating of the strip along the entire heating zone takes place only with radiant tubes (RTH—Radiant Tube Heating);
furnaces in which the heating zone is in turn divided into two sections: a first section, along which the heating takes place in the so-called "direct" manner with a free flame (DFH—Direct Fired Heat) and the strip is generally heated until reaching a maximum temperature of about 650°-750° C., followed by a second section, along which the heating takes place with radiant tubes (RTH—Radiant Tube Heating) and the strip is generally heated until a maximum temperature of about 750°-900° C. is reached.

With particular reference to this last type of galvanizing furnaces, it is known to divide the first direct heating section DFH (free flame) into a plurality of combustion zones, each provided with its own burners, in order to optimize the temperature control and the thermal load of the single burners.

Furthermore, in order to reduce fuel consumption (gas) and increase combustion efficiency, upstream of the heating zone there is generally provided a passive pre-heating zone, along which the strip is pre-heated in counterflow by the combustion fumes before the latter are conveyed into the flue conduit. In the flue conduit there is then a heat exchanger for the pre-heating of the comburent (combustion air) that feeds the free flame combustion zones.

Along the first direct (free flame) heating section the strip is cleaned of residues and impurities deriving from previous processing (oils, grease, iron powder, etc.), taking care to prevent any oxidation phenomenon of its surface that would compromise the quality of the final coating.

To this end, the first direct (free flame) heating section is generally operated in excess of fuel (gas) so as to generate a reducing atmosphere in the presence of $H_2$ and CO and simultaneously able to remove and "burn" the residues and impurities. To this end, the comburent index or air index "lambda" ($\lambda$), defined as the ratio between the quantity of comburent used in combustion and the quantity of comburent required according to a stoichiometric proportion with the fuel, is less than one ($\lambda<1$), normally ranging between 0.9 and 0.98, which allows to realize a "reducing" or "non-oxidizing" atmosphere with respect to the Iron, such as to prevent the oxidation thereof.

The conduction of the first direct (free flame) heating section as described above is generally applicable for the treatment of strips made of conventional/traditional type steel, but not of AHSS type steel.

In AHSS steels there are binding elements, such as Si, Mn, Al and others, which, although in a minimum but not negligible quantity (which can reach even 4% in total), have the characteristic of binding much more easily and stably with Oxygen than Iron. When, crossing the free flame combustion zones, the strip exceeds the temperature of about 550-600° C., even if in contact with a "non-oxidizing" atmosphere, these elements bind with the Oxygen molecules present even in a minimum part ($\sim 10^{-4}$%) in the atmosphere inside the furnace chamber, giving rise to the formation of oxides. This phenomenon is referred to as "selective oxidation".

While any Iron oxides that may form on the strip as it passes through the first direct (free flame) heating section dissolve in the subsequent second indirect heating section with radiant tubes (RTH—Radiant Tube Heating) and/or in the subsequent maintaining zone with radiant tubes (RTS—Radiant Tube Soaking) which are operated in a reducing atmosphere, the oxides deriving from the binding elements present in AHSS (Si, Mn, Al and others) are more stable and cannot be removed due to their strong bond with Oxygen. Their presence, however, reduces the "wettability" of the strip by the zinc bath and, therefore, the quality of the zinc coating obtained.

When conducting continuous hot-dip galvanizing treatments of AHSS steel strips, there is therefore the need to prevent the above mentioned "selective oxidation" phenomenon from taking place during the heating phase of the strips themselves conducted in the galvanizing furnaces.

Several methods have been developed for this purpose. The method that has achieved a good degree of reliability and a reduced economic impact on the cost of the furnace and, therefore, of the galvanizing plant is known as "pre-oxidation". "Pre-oxidation" consists in promoting the formation of a layer of Iron oxide (FeO) during the heating phase when the temperature of the strip ranges between 550-600° C. and 700° C.: it is known that the formation of Iron oxide is activated at the same time as that of the oxides of the remaining binding elements (Si, Mn, Al and others) of the steel. A layer of Iron oxide, FeO, is then generated on the strip with a thickness of about 0.2-0.3 μm capable of completely coating any oxides of the binding elements.

The layer of Iron oxide generated during the heating phase of the strip at temperatures of 550-700° C. is subsequently "reduced" during the subsequent heating and/or maintaining phases with radiant tubes conducted in a reducing atmosphere: the Iron oxide (FeO) reacts with the Hydrogen present in the furnace atmosphere, the Oxygen binds to the Hydrogen forming water molecules and on the surface of the strip there remains a spongy layer of Iron which favours the adhesion of the zinc on the surface of the strip.

US20030047255A1, WO2005/017214, U.S. Pat. No. 8,609,192, EP2458022B1 and U.S. Pat. No. 3,936,543 describe some known galvanizing methods in which an attempt is made to overcome the "selective oxidation" phenomenon of the binding elements of high strength steels.

Among the different technologies that allow to carry out the "pre-oxidation" process, the one that uses for this purpose the first direct heating section with free flame or at least part of the combustion zones that compose the latter is known.

According to this known technology:

The first combustion zones that make up the first direct heating section, at which the maximum temperature reached by the strip is lower than about 550° C., are set to operate with a sub-stoichiometric combustion ratio, with a slight excess of fuel.

The subsequent combustion zones that make up the first direct heating section, at which the maximum temperature reached by the strip is higher than 550° C., are set to operate with an over-stoichiometric combustion ratio, in excess of comburent (air), so that the excess Oxygen of the combustion reaction acts as an oxidant of the Iron and of the binding elements of the steel forming the strip.

The quantity of excess Oxygen required for "pre-oxidation" is a function of various factors—including the thickness of Iron oxide to be created, the dimensions of the strip, its residence time in the combustion zones dedicated to "pre-oxidation", the heating temperature reached by the strip when crossing these combustion zones, and the composition of the steel making up the strip—and it is particularly important to be able to control it accurately. If, in fact, the thickness of the layer of Iron oxide generated during "pre-oxidation" should be less than that required, it may not be sufficient to avoid the "selective oxidation" phenomenon of the binding elements of steel. On the contrary, if the thickness of the Iron oxide layer generated during the "pre-oxidation" should be higher than required, it may not dissolve during the subsequent thermo-chemical treatment phases. In any case, the quality of the galvanizing coating would be negatively affected.

It is therefore felt the need to have combustion systems to be used at the combustion zones dedicated to the conduction of the "pre-oxidation" process which allow to vary the quantity of Oxygen (i.e., the excess of comburent air) with rapidity and precision when required and to keep the combustion ratio constant even during power transients.

In fact, even in the presence of a steel strip with constant characteristics throughout its entire development, the galvanizing plant is in general subject to more or less rapid transients (i.e., acceleration or deceleration phases), which imply variations in the thermal load of the relative furnace with the consequent need to control over time the process parameters, including the quantity of excess Oxygen, which control "pre-oxidation".

At present, in order to satisfy the above-mentioned requirement, it is known to equip the combustion zones dedicated to the conduction of the "pre-oxidation" process with combustion systems consisting of so-called "premixed" burners—that is, which generate a premixed flame—fed with not pre-heated (comburent) air. The use of pre-heated (comburent) air, in fact, does not allow to precisely control and maintain the desired combustion ratio. In fact, pre-heated air is subject to variations in temperature, which occur particularly during transients, and consequently in volume and density. These variations make it difficult to accurately control the gas flowrate control valves, which are generally driven according to the air flowrate, in order to keep the desired combustion ratio constant.

In galvanizing furnaces where the heating zone is divided into a first direct heating section (DFH) until the strip is heated to a maximum temperature of about 650°-750° C. and a second indirect heating section with radiant tubes (RTH) until the strip is heated to a maximum temperature of about 750°-950° C., the combustion zones dedicated, when necessary, to the conduction of the "pre-oxidation" process are the combustion zones that make up the final stretch of the first direct heating section, at which the strip has reached a heating temperature of about 550°-700° C. These combustion zones are those equipped with premixed burners fed with not-preheated air.

The combustion zones that make up the initial stretch of the first direct heating section (DFH) are instead equipped with so-called "diffusive" burners—that is, they generate a diffusive or diffusion flame—fed with pre-heated (comburent) air.

According to this prior art, the premixed type burners equipping the combustion zones of the final stretch of the first direct heating section are always fed with not-preheated air: both when they are operated with an over-stoichiometric combustion ratio in order to conduct a "pre-oxidation" process, which is necessary if the strip is made of AHSS high strength steel, and when they are operated with a sub-stoichiometric combustion ratio in order to achieve a "non-oxidizing" atmosphere, which is necessary if the strip is made of conventional/traditional steel.

The use of not-preheated combustion air results in high fuel consumption and a loss of combustion efficiency.

Furthermore, considering that, normally, a galvanizing plant processes strips in conventional/traditional steels for 60-70% of the time and only for the remaining 30-40% of the time strip in AHSS high strength steels, it appears evident that for a good part of the time of use the relative galvanizing furnace is conducted under conditions of poor energy efficiency.

The premixed type burners that equip the combustion zones of the final stretch of the first direct heating section are then fed with a mixture of fuel and comburent (gas and air) formed upstream of them. This entails safety problems, as it is necessary to transport a considerable quantity of potentially explosive mixture along the plant piping.

Moreover, as mentioned above, in galvanizing furnaces where the heating zone is divided into a first direct heating section and a second indirect heating section, only a part of the combustion zones making up the final stretch of the first section are equipped with premixed type burners which, when necessary, are operated to carry out the "pre-oxidation" process. The combustion zones that make up the initial stretch of the first direct heating section are equipped with diffusive type burners fed with preheated air.

Such a galvanizing furnace configuration is little flexible and not adaptable to different process requirements.

On the one hand, in fact, the "pre-oxidation" process can be carried out only in the combustion zones equipped with the premixed type burners; however, there could be cases in which it would be necessary to extend the stretch of the first direct heating section dedicated to the conduction of the "pre-oxidation" process to upstream combustion zones which, instead, are equipped with diffusive type burners fed with pre-heated air.

On the other hand, extending the stretch of the first direct heating section dedicated to conducting the "pre-oxidation" process, also equipping the combustion zones of the initial stretch with premixed burners fed with not-preheated air, would lead to a worsening of the energy efficiency of the furnace.

The object of the present invention is to provide a direct flame burner unit for furnaces for thermo-chemical treatment of steel strips in continuous hot-dip galvanizing plants which enables to overcome the drawbacks of the prior art.

An object of the present invention is to provide a burner unit which ensures the performance in terms of rapidity and control accuracy that are necessary, for example, to effectively carry out the "pre-oxidation" process, when required, and which enables the optimization of fuel consumption, particularly when the "pre-oxidation" process is not required.

A further object of the present invention is to provide a direct flame burner unit that allows increasing the safety of the furnaces and galvanizing plants equipped therewith.

Another object of the present invention is to provide a versatile direct flame burner unit which is easily adaptable to different process requirements, in particular to different requirements of the heating process with or without "pre-oxidation" of the steel strips subject to galvanizing.

Another object of the present invention is to provide a direct flame burner unit that allows increasing the flexibility and the adaptability of the furnaces for thermo-chemical treatment of steel strips in surface coating plants, such as galvanizing plants, to different process requirements varying, for example, according to the type of steel forming the strips.

Another object of the present invention is to provide a direct flame burner unit for furnaces for thermo-chemical treatment of steel strips in continuous hot-dip galvanizing plants which can be adopted in furnaces, horizontal or vertical, of known type and also already existing with a limited number of adaptation operations.

Another object of the present invention is to realize a direct flame burner unit for furnaces for thermo-chemical treatment of steel strips in continuous hot-dip galvanizing plants, particularly simple and functional, with contained costs.

These objects according to the present invention are achieved by realizing a direct flame burner unit for furnaces for thermo-chemical treatment of steel strips in continuous hot-dip galvanizing plants as set forth in claim 1.

These objects according to the present invention are achieved by realizing a furnace for thermo-chemical treatment of steel strips in continuous hot-dip galvanizing plants as set forth in claim 11.

Further features are comprised in the dependent claims.

The features and advantages of a direct flame burner unit for furnaces for thermo-chemical treatment of steel strips in continuous hot-dip galvanizing plants and of a furnace equipped with such a burner unit according to the present invention will be more apparent from the following description, which is illustrative and not limiting, referring to the attached schematic drawings in which.

Figure 8:
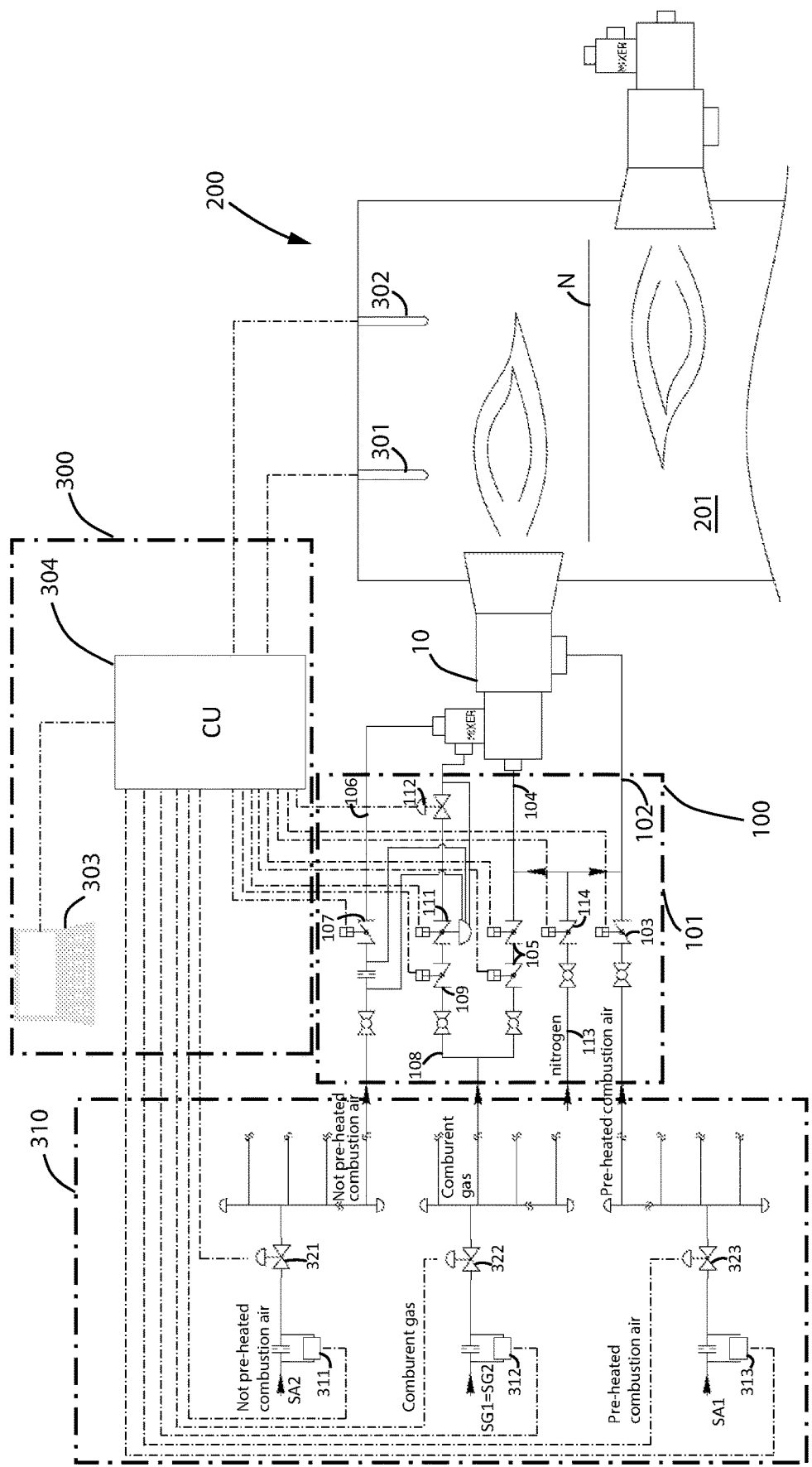

FIG. 8 schematically shows the control system relative to one of the zones into which the free flame section of a furnace according to the present invention is divided.

It should be noted that in the present description, conventional/traditional steels are intended to indicate steels which, due to their chemical composition, are not subject to the "selective oxidation" phenomenon and therefore do not require a "pre-oxidation" treatment; while high strength steels are intended to indicate, in particular, those steels which, due to their chemical composition, are subject to the "selective oxidation" phenomenon and therefore need to be subjected to a "pre-oxidation" treatment, in particular due to the presence of binding elements such as Si, Mn, Al.

With reference to the attached figures, a burner unit 100 of the direct flame type for furnaces 200 for heat treatment of steel strips in continuous hot-dip galvanizing plants is shown.

The burner unit 100 comprises a burner 10 comprising:
 a combustion head 11 wherein a combustion chamber 12 is obtained, said combustion chamber being provided with an exit opening 13 for the combustion flame; and a body 14 to which the combustion head 11 is fixed.

The combustion head 11 is intended to be at least partially housed in the treatment chamber 201 inside the furnace 200. The combustion head 11 is generally made of refractory material and, as further described below, can be variously shaped, i.e., the combustion chamber 12 formed therein can be variously shaped, to generate so-called "long" flames or so-called "flat" flames.

The body 14 is intended to be arranged externally to the treatment chamber 201. The body 14 is generally made of steel. It should be noted that "body 14" is not intended to indicate a body necessarily made as one piece, but a body which, as is evident from the attached figures, is generally made of a plurality of components assembled together and fixed, for example by welding or by means of bolts, so as to form a single body.

The body 14 is generally provided with a flange 15 for fixing the burner to the wall 202 delimiting the chamber 201 of the furnace 200.

The body 14 comprises:
- a first chamber 16 provided with at least an inlet opening 17 which is connectable to a supply source SA1 of a pre-heated comburent, wherein the first chamber 16 is in fluid communication with the combustion chamber 12;
- at least a first lance 18 for the injection of a fuel into the combustion chamber 12 and having an inlet end which is connectable to a first supply source of a fuel SG1 and an outlet end in fluid communication with the combustion chamber 12;
- a mixing chamber 19 provided with at least a first inlet opening 20 which is connectable to a supply source of a not pre-heated comburent SA2, with at least a second inlet opening 21 which is connectable to a second supply source of a fuel SG2 and with at least an outlet opening 22 of the mixture formed inside said mixing chamber;
- at least a second lance 23 for the injection of the mixture formed in the mixing chamber 19 into the combustion chamber 12, and having an inlet end in fluid communication with the at least an outlet opening 22 of the mixing chamber 19 and an outlet end in fluid communication with the combustion chamber 12.

The burner 10 is also provided with piping and connections, generally indicated with reference number 24 for the equipment of the same with ignition systems, flame detection probes and any additional probes or control sensors, not shown being of a type known to the person skilled in the art. Such piping and connections 24 are generally mounted on the combustion head 11 and are in communication with the combustion chamber 12.

Such a body structure 14 allows the burner 10 to be operated alternately and selectively in two distinct operating modes:
- a diffusive flame (or diffusion flame) combustion mode, wherein the combustion chamber 12 is fed only through the first chamber 16 and the first lance 18 respectively with the preheated comburent and fuel, and
- a premixed flame combustion mode, wherein the combustion chamber 12 is fed only by means of the second lance 23 with the mixture of not-preheated comburent and fuel formed inside the mixing chamber 19.

The term comburent refers in particular to air.

A fuel is defined as a gaseous fuel such as natural gas, coke furnace gas, propane gas, synthetic gas, methane, hydrogen or mixtures thereof.

The fuel feeding the first lance 18 and the fuel feeding the mixing chamber 19 may be the same or different from each other; in case they are the same, the first source SG1 and the second source SG2 of fuel may coincide with each other or be separated from each other.

The source of preheated comburent SA1 can advantageously be constituted by a heat recuperator of the combustion fumes such as, for example, a centralized recuperator arranged in the fumes conduit of the furnace 200 through which, in steady state conditions, the air (comburent) reaches temperatures of about 400°-550° C., generally 500° C., with known reductions in gas consumption and in carbon dioxide production.

The not-preheated comburent source SA2 may consist of ambient air at room temperature.

In the attached figures the supply sources of comburent and fuel are only schematically represented, being of a type known to the person skilled in the art.

In addition, for simplicity's sake, reference may be made in the following description to gas and air instead of fuel and comburent.

The operation of the burner 10 in either of the above two operating modes is a function of the requirements of the thermo-chemical treatment process conducted in the furnace 200 which, in particular, may depend on the type of steel forming the processed strip. In particular, the burner 10 is operated in diffusive flame combustion mode when it is not necessary to conduct "pre-oxidation" processes of the steel and, therefore, generally when the processed strip is made of conventional/traditional steel (i.e., not of the AHSS high strength type or whose chemical composition does not require the execution of such a "pre-oxidation" process). In such a case, the burner 10 is operated with a sub-stoichiometric combustion ratio, i.e., with the lambda index $\lambda<1$, generally ranging between 0.9 and 0.98 ($0.9<\lambda<0.98$).

On the contrary, the burner 10 is operated in premixed flame combustion mode when it is necessary to carry out steel "pre-oxidation" processes and, therefore, generally when the processed strip is made of AHSS high strength steel or whose chemical composition requires a "pre-oxidation" process.

In such a case, the burner 10 is operated with an over-stoichiometric combustion ratio, i.e., with the lambda index $\lambda \geq 1$, generally ranging between 1 and 1.25 ($1 \leq \lambda \leq 1.25$).

In order to be able to operate in the two above mentioned operating modes, the burner 10 is provided with four different inlets which are separate from each other for the supply of the preheated comburent and relative fuel and of the not-preheated comburent and relative fuel respectively: the inlet opening 17 for supplying preheated air in the first chamber 16 and the first end of the first lance 18 for supplying gas, the first inlet opening 20 and the second inlet opening 21 for supplying not-preheated air and gas in the mixing chamber 19 respectively.

When the burner 10 operates in diffusive flame combustion mode, preheated air is supplied to the first chamber 16 through the inlet opening 17 and gas is supplied through the first lance 18, no air and no gas are instead supplied to the mixing chamber 19 by means of the first opening 20 and the second opening 21, respectively.

The preheated air fills the volume internal to the first chamber 16 and the gas fills the volume internal to the first lance 18, the air and gas remaining separated from each other until they are injected directly into the combustion chamber 12 where they mix and where the diffusive flame develops.

Again with reference to the diffusive flame combustion mode, the gas flowrate sent to the burner 10 is a function of the thermal demand of the single combustion zone of the furnace 200 which is equipped with a determined number of burners 10 of equal power. Each burner 10 equipping a single combustion zone is supplied with a quantity of gas equal to the total quantity required to operate the same combustion zone divided by the number of burners 10 equipping it.

The flowrate of preheated combustion air is a function of the required gas flowrate and the set combustion ratio, which the control system of the furnace and in particular of the relevant furnace zone(s) 200 automatically adjusts as described below.

The variations in power and consequently in flowrates are a function of the temperature of the treatment chamber 201 which is to be reached and of the quantity of steel to be heated: the transit speed of the strip, the thickness and the width of the strip and the heat treatment to which it is to be subjected are among the factors which are considered by the control system of the furnace and in particular of the relevant furnace zone(s).

As mentioned above, the burner 10 is operated in diffusive flame combustion mode in particular when the type of steel treated in the furnace 200 does not require any "pre-oxidation" process, such as, for example, in the case of conventional/traditional type steel, that is, due to its chemical composition, is not subject to the selective oxidation phenomenon. In such a case, the combustion ratio is generally set to be sub-stoichiometric so as to obtain the lambda index $\lambda<1$, generally ranging between 0.9 and 0.98 ($0.9 \leq \lambda \leq 0.98$), that is in slight excess of combustible gas, generating fumes and, therefore, an atmosphere in the treatment chamber 201 with reducing characteristics.

On the other hand, when the burner 10 operates in premixed flame combustion mode, the supply of preheated air through the inlet opening 17 in the first chamber 16 and the supply of gas through the first lance 18 are both inhibited and blocked. The not-preheated air and gas, on the other hand, are supplied through the first opening 20 and the second opening 21 respectively directly into the mixing chamber 19 which forms an integral part of the burner 10.

As detailed further on, in the combustion mode with premixed flame, the comburent air fed to the burner 10 is not pre-heated in order to allow a precise control over the constancy of the combustion ratio, which would not be guaranteed if the air were pre-heated and therefore subject to variations in temperature, and therefore in density, even wide ones, which are difficult to control and in general dependent on the operating regime of the furnace, the environmental conditions, etc.

It should be noted that the mixing of air and gas takes place inside the burner 10 provided for this purpose with a dedicated mixing chamber 19 which feeds the second lance 23.

Advantageously, the burner 10 comprises a second chamber 25, in essence a "plenum", which connects the outlet opening 22 of the mixing chamber 19 to the inlet end of the second lance 23.

The mixture formed in the mixing chamber 19 fills the volume internal to the second lance 23 which injects it into the combustion chamber 12 where the premixed flame is formed.

Whereas in order to operate burner 10 in diffusive flame combustion mode, the gas flowrate is determined as a function of the thermal demand of the relative combustion zone and the air flowrate is determined as a function of the gas flowrate and of the established combustion ratio, to operate the burner 10 in premixed flame combustion mode, the gas flowrate "follows" the air flowrate which in turn is adjusted according to the thermal demand of the relative combustion zone.

As detailed below, in fact, the burner unit 100 is equipped with a mechanical gas flowrate control valve, known in the sector as "zero governor valve", adapted to keep the air/gas combustion ratio set during the calibration phase constant by subordinating the regulation of the gas flowrate to the air flowrate.

As mentioned above, the burner 10 is operated in premixed flame combustion mode in particular when the type of steel treated in the furnace 200 requires the execution of a "pre-oxidation" process, like for example in the case of AHSS type steel or in any case of steels which, due to their chemical composition, show the "selective oxidation" phenomenon. In such a case, the combustion ratio is generally set to be over-stoichiometric so as to obtain the lambda index $\lambda \geq 1$, generally ranging between 1 and 1.25 ($1 \leq \lambda \leq 1.25$), or in any case such as to obtain in the treatment chamber 201 an atmosphere with a quantity of Oxygen that is sufficient to create an Iron oxide layer with thickness 0.2-0.3 μm.

In order to allow the burner 10 to be operated alternatively and selectively in one or the other of the two operating modes described above without there being any possibility of a gradual passage from one to the other (which passage, as further described below, is not instantaneous, being preceded by washing of the piping from the residual gas or mixture), the burner unit 100 comprises a supply unit 101 comprising:

at least a first supply conduit 102 for supplying preheated comburent (preheated air) and which is connected to the inlet opening 17 of the first chamber 16 and which is connectable to the preheated comburent source SA1, wherein at least a first shut-off valve 103 (of the on/off type) is provided along the first supply conduit 102;

at least a second supply conduit 104 for supplying fuel (gas) and which is connected to the inlet end of the first lance 18 and which is connectable to the first fuel source SG1, wherein at least one second shut-off valve 105 (of the on/off type) is provided along the second supply conduit 104;

at least a third supply conduit 106 for supplying not-preheated comburent (not-preheated air) and which is connected to the first inlet opening 20 of the mixing chamber 19 and which is connectable to the not-preheated comburent source SA2, wherein at least a third shut-off valve 107 (of the on/off type) is provided along the third supply conduit;

at least a fourth supply conduit 108 for supplying fuel and which is connected to the second inlet opening 21 of the mixing chamber 19 and which is connectable to the second fuel source SG2, wherein at least a fourth shut-off valve 109 (of the on/off type) is provided along the fourth supply conduit 108.

The supply unit 101 is arranged to operate the burner 10 in the two operating modes described above, wherein:

in the diffusive flame combustion mode, the first shut-off valve 103 and the second shut-off valve 105 are open, and the third shut-off valve 107 and the fourth shut-off valve 109 are closed, in the premixed flame combustion mode, the third shut-off valve 107 and the fourth shut-off valve 109 are open, while the first shut-off valve 103 and the second shut-off valve 105 are closed.

The supply unit 101 further comprises at least one flow sensor or meter 110 arranged along the third supply conduit 106 and at least one comburent flowrate/fuel flowrate ratio regulator 111 arranged along the fourth supply conduit 108 and driven by the flowrate measured by the flow meter 110. The regulator 111 i.e., is a valve configured to adjust the fuel flowrate as a function of the comburent flowrate detected by the flow meter 110. As further described herein, in a preferred embodiment shown in the attached figures, the flow meter 110 is of the calibrated disc-shaped type and the regulator 111 consists of a so-called "zero governor" mechanical valve, which mechanically adjusts the gas flowrate as a function of the air pressure drop measured across the calibrated disc and which is a function of the flowrate of the flowing air. However, alternative embodiments of the flow meter 110 and/or regulator 111 are not excluded, which could consist of a gas flowrate control valve that is automatically controlled by the control system of the furnace or respective furnace zone(s).

Furthermore, the supply unit 101 comprises at least one fuel flowrate control valve 112 arranged along the fourth conduit 108 and by means of which the excess air supplied to the burner 10 can be adjusted if, in a premixed flame combustion mode, it is necessary to operate with a lambda index $\lambda \geq 1$.

The fuel flowrate control valve 112 is arranged downstream of the regulator 111 of the ratio between the comburent flowrate and the fuel flowrate and is connected to the same.

Advantageously, the supply unit 101 comprises at least a fifth supply conduit 113 for supplying a cooling fluid, for example nitrogen, into the first supply conduit 102 and the second supply conduit 104, wherein the fifth supply conduit 113 is connected to the first supply conduit 102 and to the second supply conduit 104 and is connectable to a source of a cooling fluid SR. At least a fifth shut-off valve 114 is arranged along the fifth supply conduit 113; the fifth shut-off valve 114 is open when the burner 10 is in premixed flame combustion mode and is closed when the burner 10 is in a diffusive flame combustion mode.

The supply unit 101 is operated by the furnace control system (i.e., the respective furnace zone(s) equipped by the burner 10), which control system, as further described below, is provided with a control unit (PLC) programmed to switch the operating mode of the burner 10 between the diffusive flame combustion mode and the premixed flame combustion mode.

Figure 1:
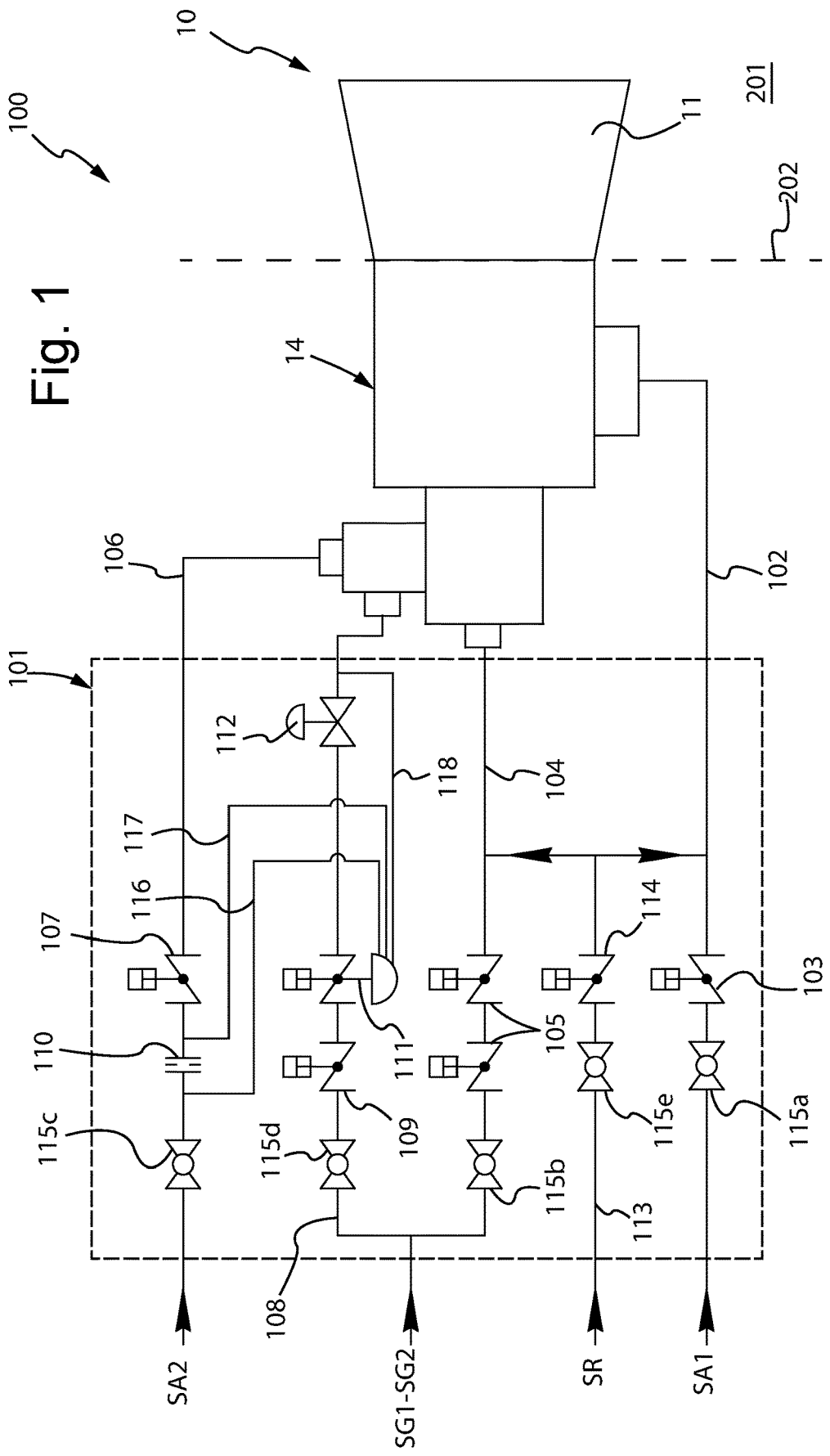
FIG. 1 is a scheme of a possible embodiment of the burner unit according to the present invention.
Figure 2:
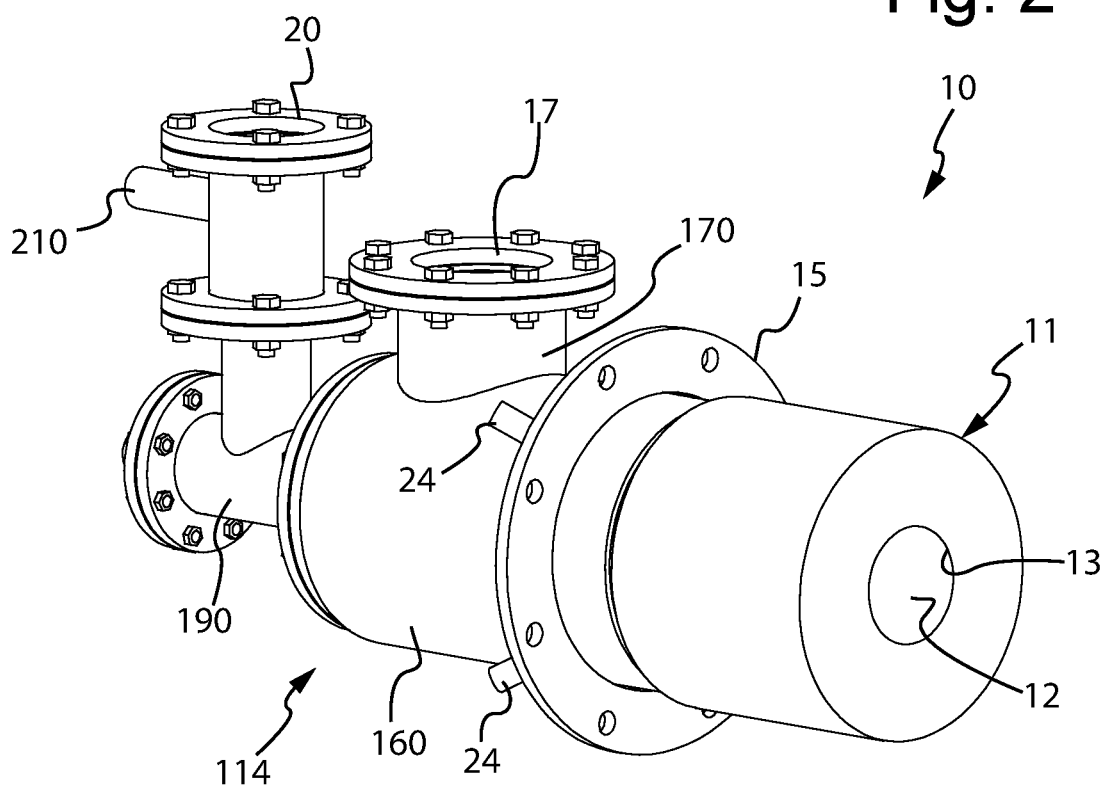
FIGS. 2 and 3 show in front-lateral and rear-lateral axonometry, respectively, a possible embodiment of the burner unit according to the present invention.
Figure 3:
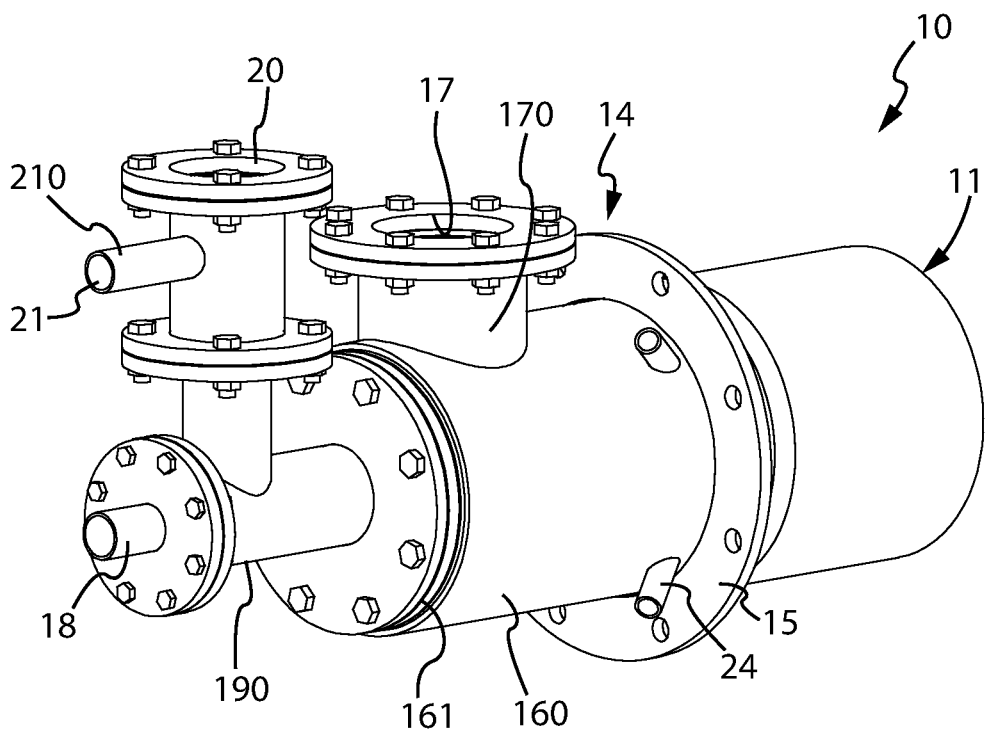
Figure 4:
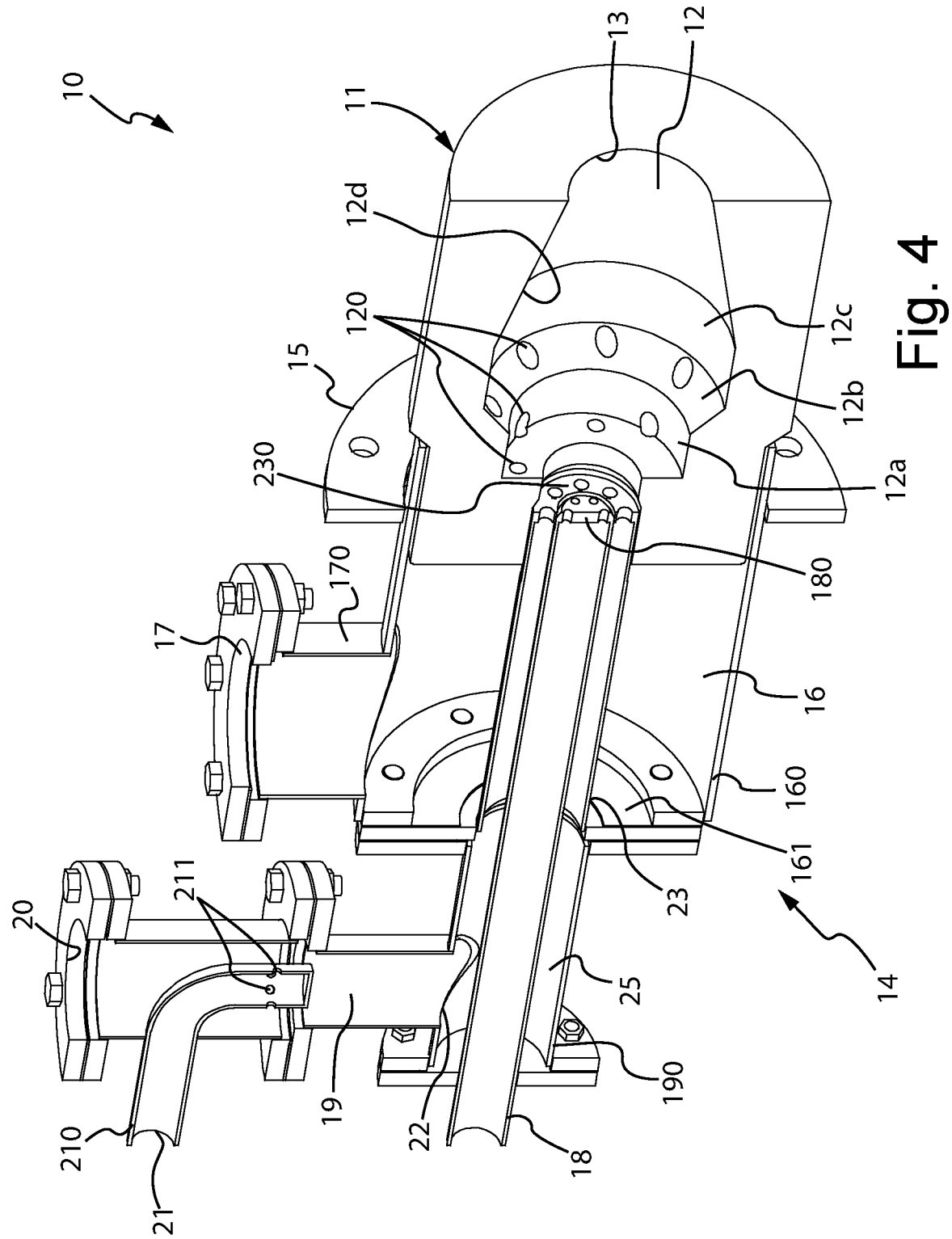
FIG. 4 is a view like that of FIG. 2 sectioned according to an axial plane.
Figure 5:
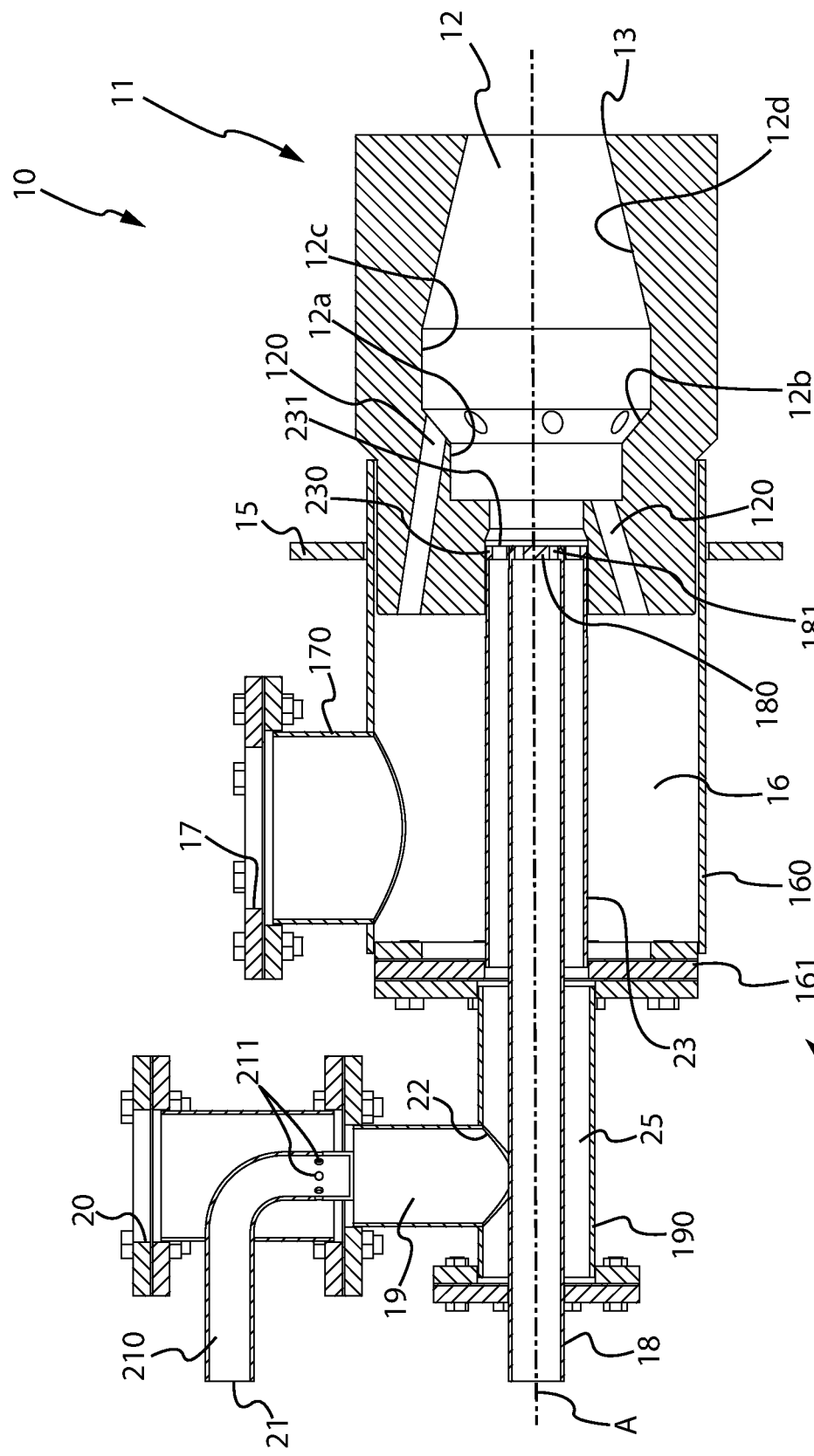
FIG. 5 is a section taken according to an axial plane of the burner as shown in FIGS. 2 to 4.

With particular reference to the burner unit 100 schematically shown in FIG. 1, it can be seen that each of the first shut-off valve 103, second shut-off valve 105, third shut-off valve 107, fourth shut-off valve 109 and fifth shut-off valve 114 are of the automatic type.

Two second shut-off valves 105 are preferably provided in series along the second gas supply conduit 104.

Along each of the first supply conduit 102, the second supply conduit 104, the third supply conduit 106, the fourth supply conduit 108, and the fifth supply conduit 113 there is also provided a respective manual shut-off valve 115a, 115b, 115c, 115d, and 115e arranged upstream of the respective shut-off valve 103, 105, 107, 109, and 114.

The flow meter 110 is of the calibrated disc-shaped type, upstream and downstream of which there is a respective connecting conduit 116, 117 (impulse tube) with the regulator 111, which in the depicted embodiment consists of a regulator known in the industry jargon as a "zero governor valve". The connecting conduits 116, 117 (impulse tubes) allow the air/gas ratio regulator 111 to be "driven" through the air pressure upstream and downstream of the meter 110.

The flow meter 110 and the air/gas ratio regulator 111 are not described in detail being of a type known to the person skilled in the art, and alternative embodiment of the same are not excluded.

The flowrate of gas supplied along the fourth supply conduit 108, therefore, "mechanically follows", by means of the regulator 111 driven by the air flowrate detected by the meter 110, the air flowrate supplied along the third supply conduit 106 and determined as a function of the thermal power required for the combustion zone equipped with the burner 10.

The air/gas ratio regulator 111 is arranged downstream of the fourth shut-off valve 109.

The control valve 112 is a micrometric control valve; it is arranged downstream of the regulator 111, a connecting conduit 118 (impulse tube) connects the fourth supply conduit 108 downstream of the control valve 112 with the regulator 111.

With reference to FIGS. 2-6, possible embodiments of the burner 10 and components thereof are described.

It should be noted that the embodiment shown in FIGS. 2 to 5 is adapted to generate a long flame, the relative burner 10 being a side burner which, therefore, can be arranged laterally to the strip both in horizontal furnaces 200 (above and below the strip) and in vertical furnaces 200 (to the side of the strip).

Figure 6:
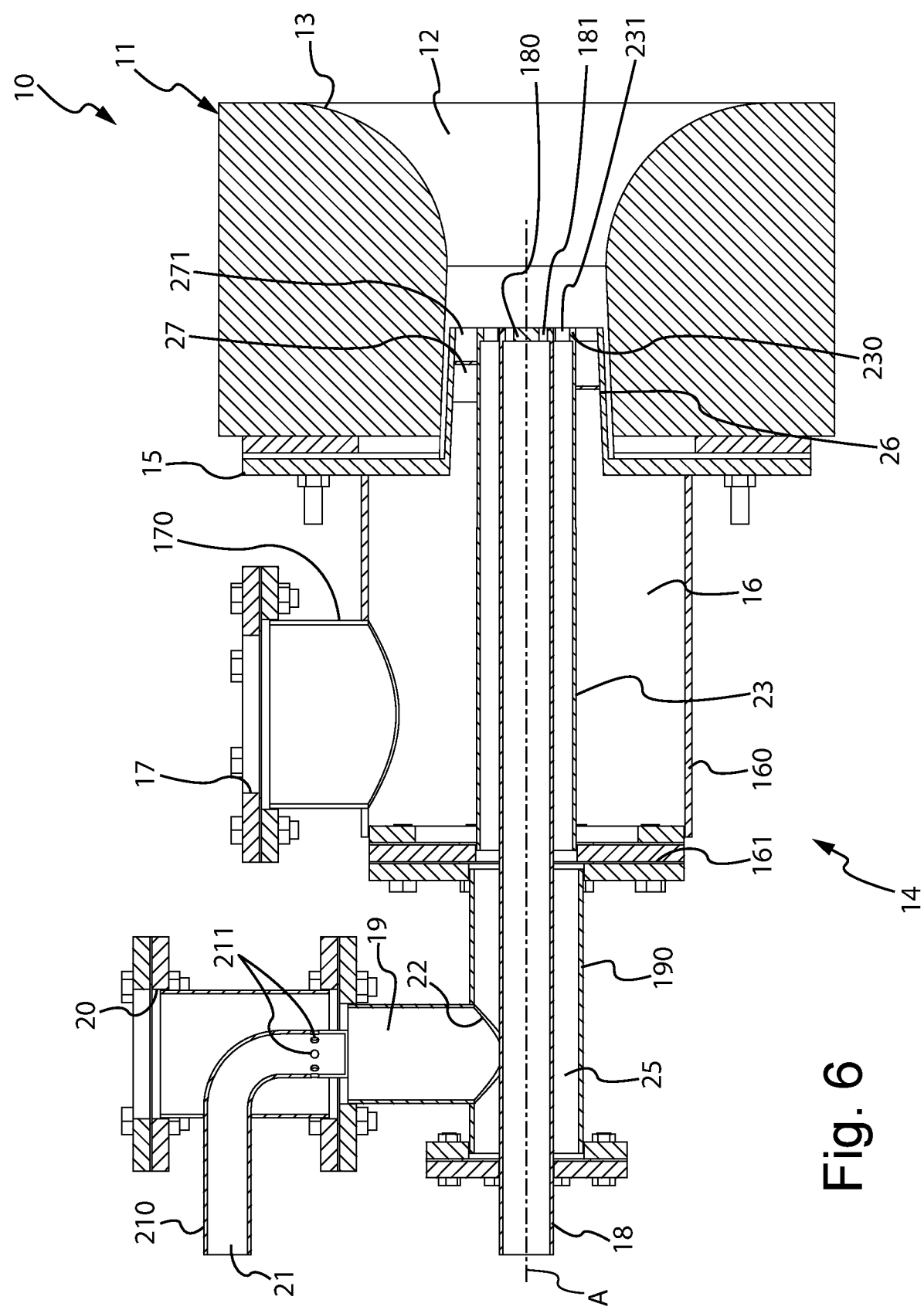
FIG. 6 is a section like that of FIG. 5 of a possible alternative embodiment of the burner of the burner unit according to the present invention.

The embodiment shown in FIG. 6 is adapted to generate a flat flame, the relative burner 10 being able to be arranged in front of the strip in both horizontal and vertical furnaces 200.

As will become clear in the following, what differentiates the embodiment of the burner 10 shown in FIGS. 2-5 from the one shown in FIG. 6 is the structure of the combustion head 11 and the fluidic connection of the combustion chamber 12 with the first chamber 16.

In both cases, the combustion chamber 12 has a longitudinal axis A with respect to which it is radially symmetrical.

The outlet end of the first lance 18 has a first diffuser 180 and the outlet end of the second lance 23 has a second diffuser 230, wherein the first diffuser 180 and the second diffuser 230 are coaxial with respect to the longitudinal axis A and open into the combustion chamber 12.

Advantageously, the first lance 18 and the second lance 23 are coaxial with respect to the longitudinal axis A and, with reference to the embodiment shown in the figures, wherein the mixing chamber 19 is arranged upstream of the first chamber 16, the first lance 18 is housed within the second lance 23 and extends outwardly from the body 14 in a direction opposite to the combustion head 11.

The first chamber 16 is defined by the volume internal to a first tubular body 160 at one end of which the combustion head 11 is fixed and whose opposite end is closed by an end flange 161 crossed by the first lance 18 and the second lance 23. The first opening 17 is defined by a branch conduit 170 of the first tubular body 160.

The flange 15 for fixing the burner 10 is fixed on the first tubular body 160.

The mixing chamber 19 is defined by a second tubular body 190 which is fixed to the first tubular body 160 at the end flange 161.

The second tubular body 190 comprises a first stretch, which is coaxial with respect to the longitudinal axis A and which delimits the second chamber 25, and a second stretch, which branches off from the first stretch and which defines the mixing chamber 19.

The first stretch is crossed by the first lance 18 and is in fluid communication with the second lance 23. The second stretch is open at an end defining the first opening 20.

The second stretch is crossed by a delivery conduit 210 having an open end arranged outside thereof and defining the second opening 21 and the opposite closed end which is arranged inside thereof in a substantially coaxial manner and in the vicinity of which the delivery conduit is crossed by a plurality of outlet holes 211 of gas fed through the second opening 21.

It should be noted that the mixing chamber 19, i.e., the second tubular body 190 defining it, forms an integral part of the burner 10 in such a way that the air-gas mixture is formed in the burner itself just before being injected into the combustion chamber 12, thus avoiding that it has to run through long conduits of the plant with potential explosion risks strictly related to the fact that the air/gas mixture is generally formed with a ratio close to the stoichiometric one.

In the embodiment shown in FIGS. 2-5, the combustion chamber 12 is cup-shaped and, preferably, comprises several longitudinal sections in succession: a first cylindrical stretch 12a, a second conical stretch 12b diverging towards the outlet opening 13, a third cylindrical stretch 12c and a fourth conical stretch 12d converging towards the outlet opening 13.

A conduit is obtained upstream of the first stretch 12a into which the outlet ends of the first lance 18 and the second lance 23, i.e., the first diffuser 180 and the second diffuser 230, open.

The first chamber 16 is in fluid communication with the combustion chamber 12 by means of a plurality of through holes 120 which, advantageously, may have different lengths so as to open into different longitudinal sections of the combustion chamber 12 allowing to realize a so-called combustion "staging". In the depicted embodiment, the through holes 120 open into the first cylindrical stretch 12a and into the second conical stretch 12b.

The number of through holes 120 of the combustion head 11 may vary from 1 to 100, preferably from 4 to 20 depending on the power of the burner 10 and the preheating temperature of the comburent air.

The through holes 120 may have circular, rectangular, elliptical or oval cross-sections.

The through holes 120 can be arranged in such a way that the injection of air into the combustion chamber 12 occurs in different longitudinal sections thereof to realize the so-called "staging" which, as is known, favours the reduction of NOx and at the same time, favours the cooling of the internal surface of the combustion head 11.

The through holes 120 may have an inclination with respect to the longitudinal axis A both tangentially and radially, thereby creating a swirl. The inclination and angle can range between −30° and +30°.

The total section of the through holes 120 is such that the nominal air exit speed preferably ranges between 70 and 130 m/s, more preferably between 70 and 110 m/s.

The above parameters indicated for the through holes 120 may be adopted individually or in various possible combinations of two or more thereof.

With reference to the embodiment shown in FIGS. 2 to 5 (adapted to generate a long flame), the outlet opening 13 has a passage section such that the average nominal speed of the combustion products in both operating modes of the burner preferably ranges between 20 and 90 m/s, more preferably between 30 and 80 m/s.

The first embodiment shown in FIGS. 2 to 5 relates to a burner 10 of a lateral type with long flame, as the flame develops mainly along the longitudinal axis A. It can therefore be mounted laterally above and below the strip in horizontal furnaces and in vertical furnaces on the sides of the strip.

The lateral type burner 10 generates a flame about 1÷1.3 m long in diffusive flame combustion mode and about 0.8÷1 m long in premixed flame combustion mode.

Such flame lengths allow to reach the centreline axis of a typical galvanizing furnace, which usually has a width equal to about 2.1÷2.5 m, and to create a uniform thermal distribution to minimise overheating of the strip edges.

In the second embodiment shown in FIG. 6, the combustion chamber 12 is "goblet" shaped with flared walls diverging towards the outlet opening 13.

In said second embodiment, the first chamber 16 is in fluid communication with the combustion chamber 12 through a conduit 26 coaxial with respect to the longitudinal axis A and in which a swirler 27 is arranged. The conduit 26 and the swirler 27 are crossed by the outlet ends of the first lance 18 and the second lance 23. The swirler 27 consists of a plurality of vanes 271 arranged along an annular crown surrounding the outlet end of the second lance 23, i.e., the second diffuser 230.

As far as the swirler 27 is concerned, advantageously the respective vanes 271 may satisfy one or more of the following parameters also in combination with each other:
  the number of vanes 271 may vary from 4 to 40, preferably from 4 to 20 as a function of the burner power 10 and of the preheating temperature of the comburent air;
  the vanes 271 have an inclination with respect to the longitudinal axis A both tangentially and radially thus creating a swirl; preferably, the inclination can range between −45° and +45°.

In the second embodiment shown in FIG. 6, the burner 10 generates a flat flame that develops in a radial direction. It can therefore be installed in vertical galvanizing furnaces in front of the strip.

The first diffuser 180 is crossed by a plurality of respective through holes 181.

The second diffuser 230 is crossed by a plurality of respective through holes 231.

As far as the first diffuser 180 equipping the first lance 18 is concerned, advantageously the respective through holes 181 may satisfy one or more of the following parameters also in combination with each other:
  the number of through holes 181 may vary from 1 to 100, preferably from 1 to 25 as a function of the power of the burner 10 and of the calorific value of the gas;
  the trough holes 181 may have circular, rectangular, elliptical or oval cross-sections;
  the trough holes 181 may have an inclination with respect to the longitudinal axis A both tangentially and radially; the inclination and angle may range between −15° and +15°;
  the total cross section of the through holes 181 is such that the nominal gas exit speed preferably ranges between 70 and 130 m/s, more preferably between 70 and 110 m/s.

As far as the second diffuser 230 equipping the second lance 23 is concerned, advantageously the respective through holes 231 may satisfy one or more of the following parameters also in combination with each other:
  the number of through holes 231 may vary from 1 to 100, preferably from 4 to 20 das a function of the power of the burner 10 and of the calorific value of the gas;
  the trough holes 231 may have circular, rectangular, elliptical or oval cross-sections;

the through holes 231 may have an inclination with respect to the longitudinal axis A both tangentially and radially, thereby creating a swirl; with reference to the embodiment shown in FIGS. 2 to 5, the through holes 231 preferably have an inclination and angle ranging between −20° and +20°, with reference to the embodiment shown in FIG. 6, the through holes 231 preferably have an inclination and angle ranging between −40° and +40°.

the total cross section of the through holes 231 is such that the nominal exit speed of the air/gas mixture preferably ranges between 50 and 100 m/s, more preferably between 70 and 90 m/s.

With reference to FIGS. 1 to 6, the operation of the burner unit 100 is now described.

If, as a function of the thermo-chemical treatment to be carried out in the furnace 200, which in turn depends on the type of steel constituting the strip being processed, it is necessary to operate the burner 10 in diffusive flame combustion mode—which occurs when the chemical composition of the steel is such that the "pre-oxidation" process is not required—then, with reference to the scheme in FIG. 1, the supply unit 101 is controlled in such a way that:

all manual shut-off valves 115a-115e, if any, are open;
the first automatic shut-off valve 103 and all second automatic shut-off valves 105 are open;
the third automatic shut-off valve 107 and the fourth automatic shut-off valve 109 are closed;
the fifth automatic shut-off valve 114, if any, is closed.

The combustion air fed from the source SA1 and advantageously preheated flows through the first supply conduit 102 and enters the first chamber 16 through the inlet opening 17. The preheated air fills the volume of the first chamber 16 and enters the combustion chamber 12 through the through holes 120 (FIGS. 2-5) or through the swirler 27 (FIG. 6), which imparts to the air flow a circular and centrifugal vortical motion ("swirl") that allows the combustion air to expand towards the profile of the walls delimiting the goblet-shaped combustion chamber 12 and to remain adherent thereto due to the "coanda" effect.

The fuel gas fed from the first source SG1 flows through the second supply conduit 104 and enters the first lance 18 filling its internal volume to be then injected into the combustion chamber 12 through the first diffuser 180.

With reference to the first embodiment shown in FIGS. 2 to 5, the entire quantity of gas mixes with a first portion of combustion air injected from the through holes 120 into the first cylindrical stretch 12a of the combustion chamber 12 giving rise to a first combustion stage with diffusive flame formation. The gas in excess from this first combustion together with the combustion products and a second portion of combustion air injected by the through holes 120 into the second conical stretch 12b are mixed in the third cylindrical stretch 12c where the combustion continues in a second stage.

In the second embodiment shown in FIG. 6, the fuel gas injected by the first diffuser 180 is entrained by the circular and centrifugal motion imparted to the combustion air flow by the swirler 27. In the combustion chamber 12, a flame is generated with a flat profile that remains adherent to the walls delimiting it.

When the burner 10 operates in a diffuse flame combustion mode for conducting the heating process of conventional/traditional type steel strips, the combustion ratio is adjusted in excess gas (sub-stoichiometric) and with lambda index $\lambda \leq 1$, preferably ranging between 0.9 and 0.98 ($0.9 \leq \lambda \leq 0.98$). In such a case, a gaseous mixture having a temperature above about 1350° C. and whose composition consists of inert combustion products such as $N_2$, $CO_2$ and $H_2O$ and of CO, $H_2$ and of the excess fuel gas exits from the outlet opening 13.

In the first embodiment shown in FIGS. 2-5, said gaseous mixture is accelerated towards the outlet opening 13 by the fourth converging conical stretch 12d of the combustion chamber 12.

The flowrates of combustion air and gas are measured and controlled via the control system of the furnace, that is of the respective combustion zone as described below.

The diffusive flame generated is such that the quantity of free Oxygen present in the treatment chamber 201 remains in the order of about 104%, so as not to cause the oxidation of the strip with the consequent benefit of an optimal galvanizing process. The presence of CO and $H_2$, on the other hand, favours its reduction so as to remove from the strip itself any impurities (in particular oxides) deriving from previous processing.

If, on the other hand, as a function of the thermo-chemical treatment to be carried out in the furnace 200, which in turn depends on the type of steel constituting the strip being processed, it is necessary to operate the burner 10 in premixed flame combustion mode—which occurs when the chemical composition of the steel (for example AHSS steel) is such as to require the "pre-oxidation" process—then, with reference to the scheme in FIG. 1, the supply unit 101 is controlled in such a way that:

all manual shut-off valves 115a-115e, if any, are open;
the first automatic shut-off valve 103 and all second automatic shut-off valves 105 are closed;
the third automatic shut-off valve 107 and the fourth automatic shut-off valve 109 are open;
the fifth automatic shut-off valve 114, if any, is open.

The combustion air, which is not preheated, flows through the third supply conduit 106 and, through the first opening 20, enters the mixing chamber 19.

The calibrated disc-shaped meter 110 arranged upstream of the third shut-off valve 107 generates a pressure difference upstream and downstream thereof; the pressure values upstream and downstream of the meter 110 are sent by means of connecting conduits 116, 117 (impulse tubes) to the regulator 111 (mechanical "zero governor" valve) present along the fourth supply conduit 108 downstream of the fourth automatic shut-off valve 109 and which operates so as to maintain a constant combustion ratio.

The fuel gas flows along the fourth supply conduit 108 and enters the mixing chamber 19 through the second opening 21.

Thanks to the regulator 111 (mechanical "zero governor" valve) which is present along the fourth supply conduit 108 downstream of the fourth automatic shut-off valve 109 and which is driven by the combustion air flowrate flowing along the third supply conduit 106, the gas flowrate is maintained proportional to the combustion air flowrate.

The air flowrate required for the premixed flame combustion mode is controlled and measured by the control system of the furnace, that is of the respective zone of the furnace as described below, and is linked to the gas flowrate thanks to the regulator 111 that keeps the ratio between the air and gas flowrates constant through the pressure difference generated by the calibrated disc-shaped meter 110 and the connecting conduits 116, 117.

In the mixing chamber 19, the air-gas mixture is formed, which, by means of the second chamber 25, enters the second lance 23 and is from there injected into the combustion chamber 12 through the second diffuser 230.

The premixed flame is characterised by a combustion reaction which is faster than that of a diffusive flame and which develops totally in the combustion chamber 12. Consequently, only the inert combustion products (such as $CO_2$, $H_2O$, $N_2$, $O_2$, NOx) and the excess Oxygen necessary for the "pre-oxidation" process of the strip escape from the outlet opening 13.

With reference to the second embodiment of FIG. 6, the through holes 231 of the second diffuser 230 have an inclination such as to give the mixture a circular and centrifugal motion, better known as a "swirl", which allows the mixture itself, and consequently the premixed flame, to expand on the walls delimiting the "goblet" shaped combustion chamber 12, remaining adherent to them due to the "coanda" effect.

Since all burners 10 equipping a same combustion zone of furnace 200 are operated in the same operating mode (premixed flame combustion), in the treatment chamber 201 of furnace 200 a uniform concentration of Oxygen is generated throughout its volume with particular advantages in conducting the "pre-oxidation" process of the strip.

The regulator 111 allows the combustion ratio to be kept constant even during power transients when the gas flow is "entrained" by the air flow.

Should it be necessary to vary the combustion ratio, the automatic control valve 112 is operated to adjust the gas flowrate by fine-tuning the opening or closing.

The flowrate of the refrigerant fluid (nitrogen) which, when the burner 10 is operated in a premixed flame combustion mode, is injected through the first supply conduit 102 and the second supply conduit 104 into the first chamber 16 and into the first lance 18 allows the latter and their equipment to be cooled.

The combustion ratio set during the calibration phase of the furnace is over-stoichiometric with a lambda index $\lambda \geq 1$, preferably ranging between 1 and 1.25. The premixed flame generated in the treatment chamber 201 is such that the quantity of excess Oxygen causes a controlled oxidation of the strip with the formation of an Iron oxide layer on the strip with a thickness ranging between 0.1 and 0.4 μm, preferably ranging between 0.2 and 0.3 μm, which covers any oxides of binding elements (Si, Mn, Al).

In a known manner, such Iron oxide layer is then removed by reduction in the subsequent sections of the furnace 200 with radiant tube heating and generation of a reducing atmosphere resulting in a spongy Iron layer that coats the strip and any other oxides that may have remained.

To switch the operation of the burner 10 from the premixed flame combustion mode to the diffuse flame combustion mode, the supply unit 101 is controlled such that:
- all manual shut-off valves 115a-115e, if any, are open;
- the fourth automatic shut-off valve 109 is closed earlier (about 2-6 seconds earlier) than the third automatic shut-off valve 107 so that the air transiting along the third supply conduit 106 allows the mixture of air and gas present in the mixing chamber 19, the second chamber 25 and the second lance 23 to be evacuated, in order to avoid explosion risks;
- control the remaining valves as described above.

The burner unit 100 is particularly suitable for being installed in a furnace 200 for the thermo-chemical treatment of steel strips in surface coating plants such as continuous hot-dip galvanizing.

Such a furnace 200 comprises in succession to each other and in a known manner:
- a heating zone for heating of the steel strips until a heating temperature is reached,
- maintaining zone for maintaining the steel strips at said heating temperature, and
- a cooling zone for cooling of the steel strips until reaching a temperature close to the galvanizing temperature.

The furnace 200 is in particular of the type wherein the heating zone in turn comprises at least a first direct flame section followed by a second radiant tube section, wherein the first direct flame section is divided into one or more combustion zones.

According to the present invention, at least one of the combustion zones composing the first direct flame section is provided with at least a free flame burner unit 100 as described above.

The furnace 200 comprises a control system 300 of said at least one combustion zone adapted to control the at least one free flame burner unit 100 equipping it by controlling the switching between the diffusive flame mode and the premixed flame mode and the respective combustion ratio also as a function of the type of steel constituting said steel strips.

Typically, the first direct flame or free flame section of the heating zone of the furnace 200 consists of a plurality of combustion zones Z1, Z2, ... Zn, each of which heats the web from a temperature X to a temperature Y where X is the temperature of the strip at the inlet $(X_1, X_2, \ldots, X_n)$ and Y is the temperature of the strip at the outlet $(Y_1, Y_2, \ldots, Y_n)$.

In the entire first direct flame section, the strip is heated from temperature $X_1$ to temperature $Y_n$. Generally, the temperature $X_1$ is equal to the ambient temperature or about 200-300° C. if there is a pre-heating zone upstream of the heating zone for the strip with passive heat recovery of the fumes evacuated from the furnace, while the temperature $Y_n$ reached by the strip as it exits the first direct flame section of the heating zone usually ranges between 650-750° C.

Generally, in view of the fact that the "pre-oxidation" process is conducted when the strip is heated to a temperature ranging between 550°-700° C., the combustion zones of the first direct flame heating section that are equipped with the burner unit 100 object of the present invention are generally those that make up the final stretch of said first heating section, at which the temperature of the strip indicatively ranges between 550-600° C. and 700° C.

Such combustion zones can be defined as "hybrid", since, as described above each burner unit 100 equipping them can be switched to a premixed flame combustion mode with controlled oxidizing atmosphere for conducting "pre-oxidation" processes or to a diffusive flame combustion mode with non-oxidizing atmosphere.

Such "hybrid" combustion zones therefore switch from one operating mode to another.

It is evident that, in order to further increase the flexibility of the operating modes of the furnace 200, also the combustion zones of the first direct flame heating section and at which the strip N reaches temperatures below 550-600° C. can be equipped with the burner unit 100 according to the present invention.

Figure 7:
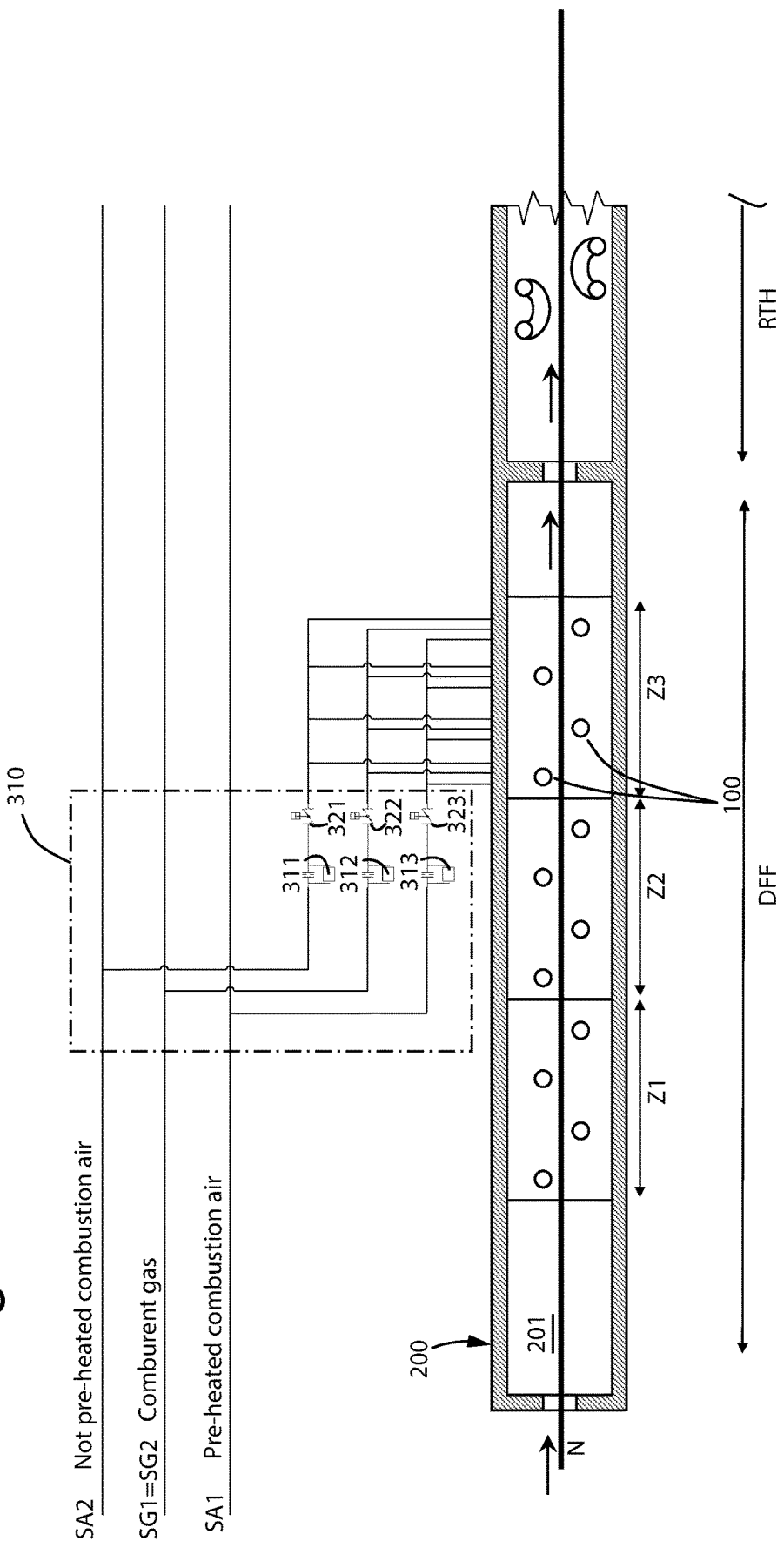
FIG. 7 is a diagram showing a possible embodiment of a horizontal type furnace of a plant for continuous hot-dip galvanizing of steel strips according to the present invention, of which only the initial stretch is shown.

In the attached FIG. 7, only the heating zone of a furnace 200 is schematically represented and, in particular, only the first direct flame section thereof, being the one to which the present invention is applied; the subsequent sections and zones of the furnace are not represented, being of a type known to those skilled in the art.

The furnace 200 is intended for a galvanizing line in which a metal strip N is heat treated. The furnace 200 is divided into a heating section with free flame burners (DFF), followed by a heating section with radiant tube burners (RTH), only partially shown. The free flame burners of the first section (DFF) are grouped in one or more combustion zones along the strip path; for example, in FIG. 7, three combustion zones are shown, respectively Z1, Z2 and Z3, each of which groups four free flame burners.

The burner unit 100 according to the present invention is particularly adapted for combustion zones at which the strip N is at a temperature above 550-600° C., which, in the case of high-alloy or high-strength steels, causes the phenomenon of selective oxidation.

In the embodiment shown in FIG. 7, for example, the third combustion zone Z3 of the first heating section DFF is equipped with four burner units 100 according to the present invention. This does not exclude, however, that also the upstream combustion zones (Z1 and Z2 in FIG. 7), along which the strip N reaches temperatures below 550-600° C., may be equipped with burner units 100 according to the present invention in order to further increase the flexibility of the furnace 200. Thanks to the possibility of alternatively and selectively controlling the two different combustion modes of each burner unit 100, the combustion zones (Z3) equipped with the burner unit 100 can be defined as "hybrid".

When the furnace 200 has to heat steels (such as, for example, AHSS steels) with chemical composition such as to require conducting "pre-oxidation" processes, the control system 300 controls each combustion zone (Z1, Z2 and Z3 in FIG. 7) of the first direct flame heating section (DFF) and, with reference to the combustion zones equipped with the burner unit 100 (Z3 in FIG. 7), it controls the supply unit 101 of each burner unit 100 equipping it to automatically switch the respective burner 10 from the diffusive flame combustion mode to the premixed flame combustion mode.

FIG. 8 schematically shows a burner unit 100 according to the present invention whose respective burner 10 is one of those equipping a combustion zone (Z3) of the first direct flame heating section DFF of the furnace 200 and whose respective supply unit 101 is connected to the supply system 310 equipping the furnace 200 or rather the respective combustion zone (Z3 with reference to FIG. 7).

The supply system 310 of each combustion zone (Z3) equipped with one or more burner units 100 according to the present invention comprises:
  a not-preheated air supply line connecting the respective source SA2 to the third supply conduit 106 of the supply unit 101 of each burner unit 100 equipping said combustion zone, and along which a flow meter 311 and a control valve 321 are arranged;
  at least one fuel supply line connecting the respective sources SG1 and SG2 to the second and fourth supply conduit 104 and 108 of the supply unit 101 of each burner unit 100 equipping said combustion zone, and along which a flow meter 312 and a control valve 322 are arranged;
  a preheated air supply line connecting the respective source SA1 to the first supply conduit 102 of the supply unit 101 of each burner unit 100 equipping said combustion zone, and along which a flow meter 313 and a control valve 323 are arranged.

FIG. 8 shows the connection of the supply system 310 to the supply unit 101 of only one of the burner groups 100 that equip the same combustion zone (Z3 in FIG. 7), the connection to the supply unit 101 of the remaining burner groups 100 that equip the same zone being represented with an interrupted line.

The control system 300 comprises a control unit (PLC) 304 to which an interface terminal 303 is connected.

The control unit 304 is generally unique for the entire furnace 200 or at least for the same zone of the furnace (i.e., heating zone, maintaining zone, and cooling zone) and is configured and programmed to control each zone of the furnace (i.e., heating zone, maintaining zone, and cooling zone), each section into which each zone of the furnace is possibly divided (i.e., first direct flame heating section and second radiant tube heating section of the heating zone), and each combustion zone into which each zone or section is further divided.

As relevant herein, the control unit 304 is configured and programmed to control each combustion zone (Z1, Z2 and Z3) into which the first direct flame heating section (DFF) is divided.

With specific reference to each combustion zone (Z3 in FIG. 7) of the first direct flame heating (DFF) section which is equipped with one or more burner units 100 according to the present invention, the control unit 304 receives at the inlet:
  the flowrate measurement signals output by the flow meter 111 of the supply unit 101 of each burner unit 100 equipping said combustion zone (Z3);
  the flowrate measurement signals output by each flow meter 311, 312 and 313 of the supply system 310 of the respective combustion zone (Z3) and respectively relating to the flowrate of not-preheated combustion air for premixed operation, the flowrate of fuel gas and the flowrate of preheated combustion air for diffusive operation;
  the measurement signals of the temperature and quantity of oxygen output by at least one temperature probe 301 and at least one oxygen probe 302 respectively that equip the respective combustion zone (Z3).

Again with reference to each combustion zone (Z3 in FIG. 7) of the first direct flame heating section (DFF) which is equipped with burner units 100 according to the present invention, the control unit 304 controls:
  each control valve 321, 322 and 323 of the supply system 310 of the respective combustion zone (Z3) for adjusting the not-preheated air flowrate, the fuel flowrate and the pre-heated air flowrate, respectively;
  the first shut-off valve 103, the second shut-off valve 105, the third shut-off valve 107 and the fourth shut-off valve 109 of the supply unit 101 of each burner unit 100 equipping said combustion zone (Z3).

Furthermore, again with reference to each combustion zone (Z3 in FIG. 7) of the first direct flame heating section (DFF) which is equipped with burner units 100 according to the present invention, the control unit 304 controls, if any:
  the regulator 111 and the control valve 112 of the supply unit 101 of each burner unit 100 equipping said combustion zone (Z3);
  the fifth control valve 115 for supplying flushing nitrogen.

With reference to FIGS. 7 and 8, the control system 300 operates in such a way that, when the strip N to be treated is made of steel for which the "pre-oxidation" treatment is not envisaged, or in any case of steel not subject to "selective oxidation" phenomena, each burner 10 equipping the combustion zone Z3 operates in diffusive flame combustion mode.

In this case, the control unit 304:
  controls and keeps closed the third, fourth and fifth shut-off valve 107, 109 and 114, of the supply unit 101 of each burner unit 100, blocking the supply of not-preheated air, of gas directed to the mixing chamber of each burner 10 and of flushing nitrogen, respectively, controls and keeps open the first and second shut-off valve 103 and 105 of the supply unit 101 of each burner unit 100 respectively to supply preheated air and gas to each burner 10.

The combustion ratio is set by the operator via terminal 303. Generally, when the strip material to be treated is a steel not subject to "selective oxidation" phenomena, the combustion ratio is set to obtain a "lambda" ranging between 0.9 and 0.98, i.e., a slight excess of combustible gas, thus generating fumes, and therefore an atmosphere in the furnace 200, with reducing characteristics.

The required heat output is calculated instant by instant by the control unit 304 in operation:
of the temperature inside the furnace 200, measured by the temperature probe 301;
of the set temperature set by control unit 304.

On the basis of the required heat output, the flowrate of fuel gas required to generate it is determined: the control unit 304 acts on the control valve 322 of the gas supply line so as to obtain for the relevant combustion zone Z3 the required gas flowrate, which flowrate is continuously measured by the respective flow meter 312.

On the basis of the determined gas flowrate and the set combustion ratio, the control unit 304 determines the comburent air flowrate required to ensure this combustion ratio: the control unit 304 acts on the control valve 323 of the preheated air supply line in order to obtain the air flowrate required by the combustion zone Z3, which flowrate is continuously measured by the respective flow meter 313.

Again with reference to FIGS. 7 and 8, the control system 300 operates in such a way that, when the strip N to be treated is made of steel for which the "pre-oxidation" treatment is envisaged, being subject to "selective oxidation" phenomena, each burner equipping the combustion zone Z3 operates in premixed flame combustion mode.

In this case, the control unit 304:
controls and keeps open the third, fourth and fifth shut-off valve 107, 109 and 114, of the supply unit 101 of each burner unit 100, respectively for supplying not-preheated air, gas directed to the mixing chamber of each burner 10 and flushing nitrogen,
controls and keeps closed the first and second shut-off valve 103 and 105 of the supply unit 101 of each burner unit 100 respectively to block the preheated air and the gas to each burner 10.

The control unit 304, moreover, controls in a fully open position the control valve 322 of the fuel gas supply line of the supply system 310 of the respective combustion zone Z3, the flowrate of which is measured by the respective flow meter 312.

The required heat output is calculated instant by instant by the control unit 304 in operation:
of the temperature inside the furnace 200, measured by the temperature probe 301;
of the set temperature set by control unit 304.

On the basis of the required heat output, the flowrate of fuel gas required to generate it is determined: the control unit 304 acts on the control valve 321 of the not-preheated air supply line of the supply system 310, without acting on the control valve 322 of the gas supply line, which is kept fixed in the fully open position.

The control unit 304, acting on the control valve 321, varies the flowrate of not-preheated combustion air supplying the respective combustion zone Z3, which flowrate is constantly measured by the respective flow meter 311. Through the regulators 111 ("zero governor" valves) of the supply units 101 of each burner unit 100 equipping the combustion zone Z3, the zone gas flowrate is varied, which is constantly read by the flow meter 312.

The ratio of air and gas flowrates is kept constant by the regulator 111 which is calibrated during initial start-up and testing of the furnace 200. In order to obtain the "pre-oxidation" process of the strip N, the mixture of air and gas is such that the combustion ratio is over-stoichiometric with a "lambda" ranging indicatively between 1 and 1.25 or in any case such as to have in the chamber 201 a quantity of Oxygen such as to create a layer of Iron oxide of 0.2-0.3 μm.

In order to have maximum flexibility and to be able to vary the excess Oxygen (air) as a function of the process requirements, the combustion ratio can be modified by means of the control valve 112, which is combined with the regulator 111. In particular, the control unit 304, adjusts the degree of opening of the control valve 112 according to a control loop depending on the oxygen content measured by the at least one oxygen probe 302.

It is an object of the present invention also a plant for continuous surface coating of steel strips, in particular a plant for the continuous hot-dip galvanizing, provided with a furnace for thermo-chemical treatment of steel strips as described above.

The burner unit object of the present invention, being able to operate alternatively and selectively in diffusive flame combustion mode and in premixed flame combustion mode, allows conducting the respective combustion zone under optimal conditions as a function of the type of thermo-chemical treatment to be conducted which, in a furnace 200 of a galvanizing plant for steel strips, may vary according to the type of steel constituting the strip.

The premixed flame combustion mode guarantees the perfect mixing of the reagents inside the burner combustion head, from which only the combustion products (POC) and the excess Oxygen exit uniformly.

The diffusive flame combustion mode, on the other hand, by its definition, combined with combustion techniques ("staging") adapted to reduce NOx emissions that dilute the flame, does not guarantee the completion of the combustion inside the combustion head of the burner especially during power transients. This combustion mode is not suitable for conducting "pre-oxidation" processes, since it can generate in the furnace an atmosphere that is not perfectly homogeneous and consequently affect the process of Iron oxidation. Such a diffuse flame combustion mode is therefore activated if the thermo-chemical treatment to be conducted does not require an oxidation process such as the "pre-oxidation" process of the Iron contained in the steel.

Thanks to the fact that the burner according to the present invention is provided with four separate inlets, two for the combustion air and two for the fuel gas, it is possible to differentiate the combustion air supplying the burner when it is operated in a diffuse flame combustion mode from that supplying the burner when it is operated in a premixed flame combustion mode, in particular by adopting preheated air for the first mode and not-preheated air for the second mode. This reduces fuel consumption when treating conventional/traditional steel strips.

Due to the fact that the burner according to the present invention is provided with four separate inlets, two for the combustion air and two for the fuel gas, it is also possible to differentiate the combustion ratio control modes when the burner is operated in the diffuse flame combustion mode or in the premixed flame combustion mode.

When the burner is operated in premixed flame combustion mode to conduct the "pre-oxidation" process, the air/gas regulator ("zero governor valve") allows the air/gas ratio to be kept constant. In this case, in order to obtain maximum precision in maintaining the set combustion ratio, the combustion air is deliberately not pre-heated so that it is not subject to temperature variations and the pressure drop that drives the air/gas regulator generated is constant at the same flowrate.

When the burner is operated in premixed flame combustion mode, it is also possible to vary the excess Oxygen (air) according to the process requirements, the combustion ratio can in fact be modified by means of the automatic micrometric control valve located along the gas supply line downstream of the regulator and connected to the latter.

The air/gas regulator ("zero governor valve"), once calibrated during furnace start-up, keeps the air/gas ratio constant, while the automatic micrometric control valve downstream of it acts when a variation in the combustion ratio of the single burner is required.

The excess of air is controlled through an automatic loop that adjusts the opening or closing of the automatic micrometric control valve according also to the Oxygen value measured by one or more analysis probes present in each combustion zone.

When the burner is operated in premixed flame combustion mode, moreover, by acting on the control valves of the pre-heated air and gas supply lines of the supply system of the combustion zone it is possible to adjust the power of the respective combustion zone both in proportional (modulated) and on/off mode. Each burner can then be turned off and the power redistributed to the lit burners. This factor further improves the thermal distribution in the chamber.

Thanks to the fact that in the premixed flame combustion mode, the gas-air mixture is formed in a mixing chamber inside the burner body, potential explosion hazards related to the circulation of such a mixture inside the pipes equipping the furnace are eliminated.

The burner unit object of the present invention, being able to operate alternatively and selectively in diffusive flame combustion mode and in premixed flame combustion mode, is particularly flexible and versatile being able to adapt to different process requirements with a fast and precise response.

By using preheated air when operating in diffuse flame combustion mode, it allows reducing gas consumption and increasing combustion efficiency.

The burner unit object of the present invention, can be applied both on vertical and horizontal furnaces and can equip all the combustion zones (and not only those of the end stretch) of the first free flame section of the free flame heating zone of a galvanizing furnace, further increasing its flexibility.

The burner unit as conceived herein is susceptible to many modifications and variations, all falling within the invention; furthermore, all the details are replaceable by technically equivalent elements. In practice, the materials used, as well as the dimensions thereof, can be of any type according to the technical requirements.

The invention claimed is:

1. A direct flame burner unit for furnaces for the thermochemical treatment of steel strips in continuous hot-dip galvanizing plants, wherein the direct flame burner comprises a burner comprising:
    a combustion head wherein a combustion chamber is obtained, said combustion chamber being provided with an exit opening for the combustion flame;
    a body to which said combustion head is fixed and comprising:
        a first chamber provided with at least an inlet opening which is connectable to a supply source of a pre-heated comburent, wherein said first chamber is in fluid communication with said combustion chamber;
        at least a first lance for the injection of a fuel into said combustion chamber and having an inlet end which is connectable to a first supply source of a fuel and an outlet end in fluid communication with said combustion chamber;
        a mixing chamber provided with at least a first inlet opening which is connectable to a supply source of a not pre-heated comburent, with at least a second inlet opening which is connectable to a second supply source of a fuel and with at least an outlet opening of the mixture formed inside said mixing chamber;
        at least a second lance for the injection of said mixture into said combustion chamber and having an inlet end in fluid communication with said at least an outlet opening of said mixing chamber and an outlet end in fluid communication with said combustion chamber;
    said burner being alternatively and selectively operable in two distinct operating modes:
        a diffusive flame combustion mode, with lambda ranging between 0.9 and 0.98, wherein said combustion chamber is fed only through said first chamber and said first lance respectively with said preheated comburent and with said fuel, and
        a premixed flame combustion mode, with lambda ranging between 1 and 1.25, wherein said combustion chamber is fed only by means of said second lance with said mixture formed inside said mixing chamber,
    wherein the burner comprises a supply unit comprising:
        at least a first supply conduit for supplying said preheated comburent and which is connected to said inlet opening of said first chamber and which is connectable to said preheated comburent source, at least a first shut-off valve being provided along said first supply conduit;
        at least a second supply conduct for feeding said fuel and which is connected to said inlet end of said first lance and which is connectable to said first fuel source at least a second shut-off valve being provided along said second supply conduct;
        at least a third supply conduct for feeding said not-preheated comburent and which is connected to said first inlet opening of said mixing chamber and which is connectable to said not-preheated comburent source, at least a third shut-off valve being provided along said third supply conduct; and
        at least a fourth supply conduct for supplying said fuel and which is connected to said second inlet opening of said mixing chamber and which is connectable to said second fuel source at least a fourth shut-off valve being provided along said fourth supply conduct;
    wherein in said diffusive flame combustion mode said first shut-off valve and said second shut-off valve are open, said third shut-off valve and said fourth shut-off valve being closed, and in said premixed flame combustion mode, said third shut-off valve and said fourth shut-off valve are open, said first shut-off valve and said second shut-off valve being closed.

2. The burner unit according to claim 1, wherein said supply unit comprises at least one flow meter arranged along said third supply conduct and at least one regulator of the ratio between the flowrate of the comburent and the flowrate of the fuel, said regulator being arranged along said fourth supply conduit and driven by the flowrate measured by said flow meter.

3. The burner unit according to claim 1, wherein said supply unit comprises at least one fuel flowrate control valve arranged along said fourth conduit.

4. The burner unit according to claim 2, wherein said fuel flowrate control valve is located downstream of said regulator of the ratio between the comburent flowrate and the fuel flowrate and is connected to the same.

5. The burner unit according to claim 1, wherein said supply unit is connected to a control unit programmed to switch the operating mode of said burner between said diffusive flame mode and said premixed flame mode.

6. The burner unit according to claim 1, wherein said body of said burner comprises a second chamber that connects said outlet opening of said mixing chamber to said inlet end of said second lance.

7. The burner unit according to claim 1, wherein said combustion chamber has a longitudinal axis, wherein said outlet end of said first lance has a first diffuser and said outlet end of said second lance has a second diffuser, said first diffuser and said second diffuser being coaxial with respect to said longitudinal axis and opening into said combustion chamber.

8. The burner unit according to claim 7, wherein said first chamber is in fluid communication with said combustion chamber through a conduit coaxial with respect to said longitudinal axis and wherein a swirler is arranged, said combustion chamber having a flared profile towards its outlet opening.

9. The burner unit according to claim 1, wherein said combustion head comprises a plurality of through holes connecting said first chamber to said combustion chamber, said through holes opening at the same and/or different longitudinal sections of said combustion chamber and having respective axes different from said longitudinal axis of said combustion chamber.

10. A furnace for the thermo-chemical treatment of steel strips in surface coating plants, in particular continuous hot-dip galvanizing plants, said furnace comprising, in succession:
   a heating zone for heating of said steel strips until a heating temperature is reached,
   maintaining zone for maintaining said steel strips at said heating temperature, and
   a cooling zone for cooling of said steel strips until reaching a temperature close to the galvanizing temperature,
   wherein said heating zone comprises at least a first direct flame section followed by a second section with radiant tubes, said first direct flame section being divided into one or more combustion zones,
   wherein at least one of said combustion zones of said first direct flame section is provided with at least one free flame burner unit according to claim 1,
   wherein said furnace comprises a control system of said at least one combustion zone adapted to control said at least one free-flame burner unit controlling its switching between said diffusive flame mode and said premixed flame mode and the respective combustion ratio also according to the type of steel constituting said steel strips.

11. The furnace according to claim 10, wherein said control system comprises a control unit which is programmed to control the switching of said at least one free flame burner unit in a pre-mixed flame mode with an over-stoichiometric combustion ratio ($\lambda \geq 1$) and in a diffusive flame mode with a sub-stoichiometric combustion ratio ($\lambda \leq 1$).

* * * * *